United States Patent [19]

Medill et al.

[11] 3,835,259

[45] Sept. 10, 1974

[54] TIME DIVISION CONFERENCE HYBRID CIRCUIT

[75] Inventors: David Gordon Medill, Denver; Patrick Alban Vachon, Arvada, both of Colo.

[73] Assignee: Bell Telephone Laboratories, Incorporated, Murray Hill, Berkeley Heights, N.J.

[22] Filed: Mar. 22, 1973

[21] Appl. No.: 343,824

[52] U.S. Cl. ...................... 179/18 BC, 179/170 NC

[51] Int. Cl. ............................................ H04j 3/02

[58] Field of Search ...... 179/18 BC, 1 CN, 170 NC, 179/15 AT, 15 BF, 15 AD, 175.2 R, 175.2 C, 170.4, 170.8; 178/59; 325/42

[56] References Cited

UNITED STATES PATENTS

| | | | |
|---|---|---|---|
| 3,530,260 | 9/1970 | Gaunt | 179/170 NC |
| 3,551,600 | 12/1970 | Berch | 179/18 BC |
| 3,566,031 | 2/1971 | Carbone | 178/59 |
| 3,742,147 | 6/1973 | Carbrgy | 179/15 AT |

*Primary Examiner*—David L. Stewart
*Attorney, Agent, or Firm*—J. S. Cubert

[57] ABSTRACT

In a time division communication system a conference connection among a plurality of stations is established utilizing station associated hybrid circuits connected to an incoming common bus and an outgoing common bus in an assigned conference time slot. It is required that each station receive the outgoing signals of the other conferenced stations but not its own outgoing signal while only the station's own outgoing signal is applied to the outgoing bus in the assigned time slot. Each hybrid circuit stores the sum of the conferenced signals received from the incoming bus in the assigned time slot. The associated station's own outgoing signal in the stored conference signal is canceled by a signal derived from the station outgoing signal in a first difference amplifier so that only the signals from the other conferenced stations are applied to the associated station. The other conferenced station outgoing signals appearing at the associated station are prevented from returning to the outgoing bus through cancellation of said other station signals by a signal derived from the first amplifier output in a second difference amplifier whereby only the associated station's own outgoing signal is applied to the outgoing bus in the assigned time slot. A portion of the associated path outgoing signal from the second amplifier is applied to the hybrid storage capacitor in the interval between successive distinct time slots so that the storage capacitor includes the instantaneous value of the associated path outgoing signal for improved cancellation.

5 Claims, 2 Drawing Figures

PATENTED SEP 10 1974

3,835,259

TIME DIVISION CONFERENCE HYBRID CIRCUIT

BACKGROUND OF THE INVENTION

My invention relates to communication systems and more particularly to signal exchange arrangements utilizing hybrid line circuits in time division communication systems.

In time division communication, a plurality of signal exchanges occur over one common communication link. Each signal exchange is assigned a time slot in a repetitive time slot group. During each assigned time slot, a pair of lines are selectively connected to the common link and samples of the line signals are exchanged. In this way, a plurality of lines may be concurrently serviced by periodic selection and sampling. As is well known in the art, a periodic sampling rate greater than twice the highest frequency component in a signal exchange assures adequate signal transmission.

In some prior art time division communication systems, a resonant transfer signal exchange between a pair of line associated storage devices is utilized to accomplish the signal exchange in a distinct time slot. This type of transfer requires a relatively precise network for the signal exchange which network includes the line associated storage capacitors and inductive elements especially selected for precisely timed signal transfer. The energy exchanged in each time slot is limited to a small time sample so that a relatively large amount of signal power is needed for each exchange and only a portion of the energy transferred by means of resonant transfer lies within the desired frequency range. Thus, the electronic switches interconnecting the selected lines in a time slot must have very low losses and must be precisely timed. In addition, the conversion of the exchanged signal from sampled form to analog form requires a relatively complex filter associated with each line storage device to provide the maximum transfer of the limited energy available in the desired band.

In other time division signal transfer systems, a sample and hold switching arrangement is provided between a pair of line associated storage devices. The sample and hold arrangement inherently provides some filtering in the signal transfer so that the filter requirements are simplified. Further, inductive elements are eliminated in the transfer network. The sample and hold time division transfer systems such as illustrated in the copending application Ser. No. 276,833, filed July 31, 1972 now U.S. Pat. No. 3,804,989, issued Apr. 16, 1974, by Robert L. Carbrey and assigned to the same assignee can provide a signal transfer among a plurality of lines in each time slot. These arrangements utilize a time division hydbrid line circuit associated with each line having a plurality of capacitor stores and complex switching arrangements. It is desirable to provide sample and hold type signal transfers among a plurality of lines in a single time slot with a simpler and more economical form of line circuit.

BRIEF SUMMARY OF THE INVENTION

My invention is a time division communication system wherein a plurality of time slots occurs in repetitive cycles that includes a plurality of communication paths and first and second time division buses. Each communication path has an associated circuit connected to said path and selectively connectible to the first and second time division buses in a distinct time slot. Signals are exchanged among selected communication paths in a single time slot wherein the outgoing signals from selected communication path circuits are applied to the first time division bus. The sum of the outgoing signals is formed in a summing circuit connected between the first and second time division buses and the sum is applied to each selected circuit via the second time division bus. Each communication path includes a store for holding a sample of the sum signal received from the second time division bus in the distinct time slot and first and second amplifiers. The first amplifier has a first input connected to the store, a second input coupled to the output of the second amplifier, and an output coupled to the communication path. The first amplifier is operative to cancel the communication path outgoing signal portion of the stored sum appearing on its first input with the communication path outgoing signal from the second amplifier output appearing on the first amplifiers second input and to apply the other selected communication path signals to the communication path through an impedance. The second amplifier has a first input coupled to the communication path, a second input coupled to the first amplifier output, and an output coupled to the first time division bus. The second amplifier is operative to cancel the other selected communication path signals on the communication path appearing on its first input with the first amplifier output signal appearing on the second amplifier second input and to apply the resulting communication path outgoing signal to the first time division bus in the distinct time slot. An impedance network is connected between the second amplifier output and the store to couple the communication path outgoing signal at the second amplifier output to the store in the interval between successively occuring distinct time slots whereby changes in the communication path outgoing signal occurring in said interval are transferred to the store. In this manner, the cancellation of the communication path outgoing signal in the first amplifier is complete during the interval between successively occurring distinct time slots.

According to one aspect of the invention, the first amplifier is operative to subtract a signal corresponding to the communication path outgoing signal appearing on the output of the second amplifier from a signal corresponding to the stored sum. The second amplifier is operative to subtract a signal corresponding to the other communication path signals appearing on the first amplifier output from a signal corresponding to the other incoming signals and the outgoing signal appearing on the communication path.

According to yet another aspect of the invention, each of the first and second amplifiers is an operational amplifier adapted to implement the aforementioned subtractions.

DETAILED DESCRIPTION

Figure 1:
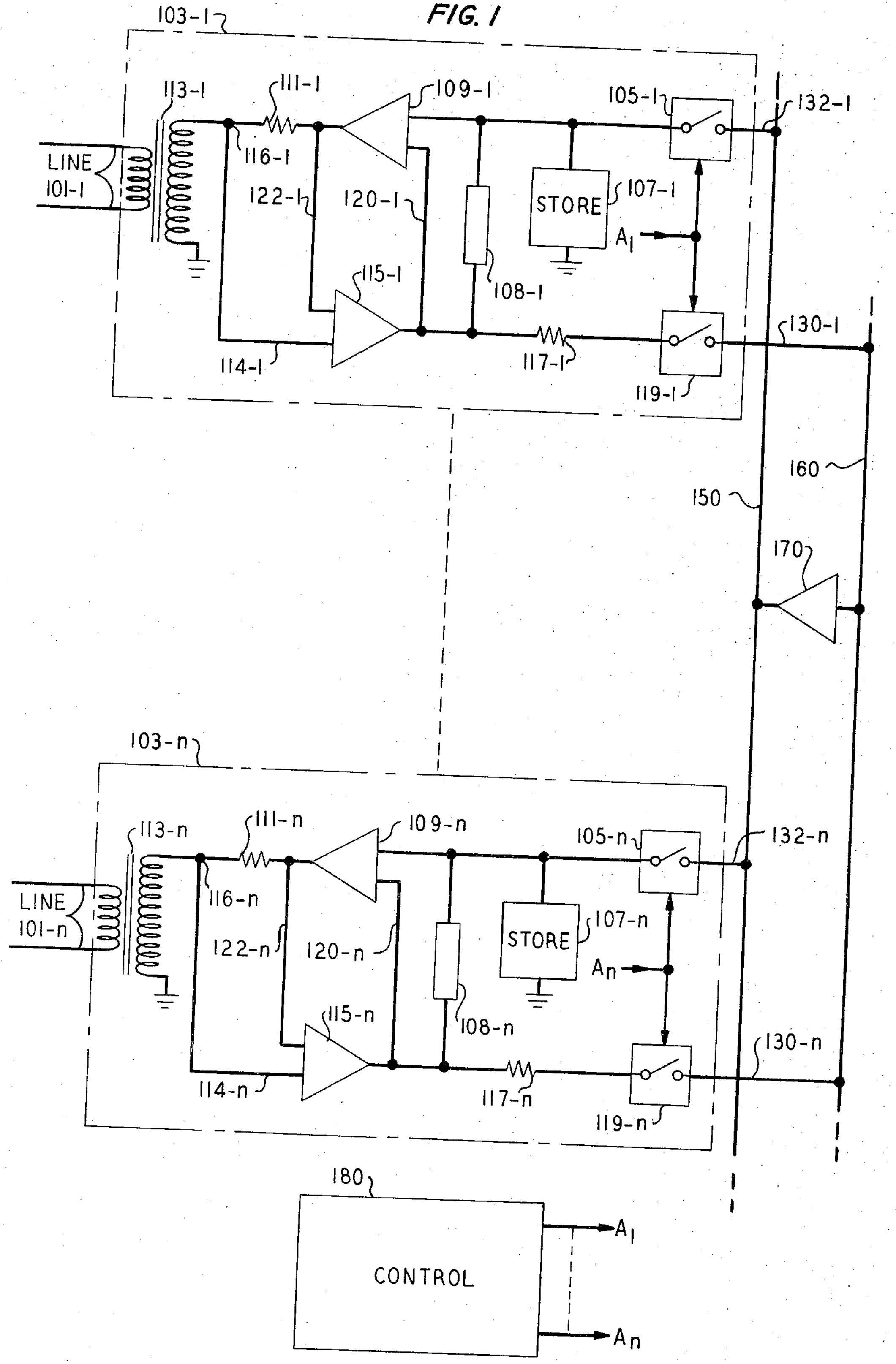
FIG. 1 depicts an embodiment illustrative of the invention.

FIG. 1 shows a time division communication system including lines 101-1 through **101-*n*, line circuits 103-1** through 103-$n$, incoming bus 150 and outgoing bus 160, summing amplifier 170, and control 180. Line circuit 103-1 is connected to line 101-1 and is also selectively connectible to common buses 150 and 160 via leads 132-1 and 130-1, respectively. Similarly, line circuit 103-$n$ is connected to line 101-$n$ and is further selectively connectible to buses 150 and 160 via leads 132-$n$ and 130-$n$, respectively. Line circuit 103-1 includes stores 107-1, which is connectible to incoming bus 150 via time division switch 105-1 and lead 132-1. Store 107-1 receives a signal from incoming bus 150 in a selected time slot and holds the signal received.

Impedance network 108-1 couples a predetermined portion of the outgoing signal originating on line 101-1 from the output of amplifier 115-1 to store 107-1 during this time interval between selected time slots. The predetermined portion is selected to be the same as the line 101-1 outgoing signal transferred to store 107-1 during the selected time slot via the time division network including bus 150, amplifier 170 and bus 160. In this way, the line 101-1 outgoing signal in store 107-1 always corresponds to the instantaneous value of the line 101-1 outgoing signal at the output of amplifier 115-1. Without impedance network 108-1, the outgoing signal on store 107-1 could differ from the changing outgoing signal at the output of amplifier 115-1.

Amplifier 109-1 in circuit 103-1 is coupled between store 107-1 and transformer 113-1. It receives the stored signal from store 107-1 on one input and the outgoing signal from the output of amplifier 115-1 on another input. Amplifier 109-1 is operative to subtract the line outgoing signal on the output of amplifier 115-1 from the stored signal on store 107-1. The resulting difference signal at the output of amplifier 109-1 is applied to one winding of transformer 113-1 via matching impedance 111-1. In this manner, the signal contribution of line 101-1 is cancelled from the signal applied to the line from the incoming bus. The output of amplifier 109-1 is then applied to line 101-1 via transformer 113-1.

Amplifier 115-1 is coupled between transformer 113-1 and outgoing bus 150 and receives the output signal from amplifier 109-1 via lead 122-1 on one input and further receives the signal appearing on terminal 116-1 which includes the outgoing signal from line 101-1 on another input. Amplifier 115-1 is operative to couple the line 101-1 outgoing signal to impedance 117-1 and to prevent the incoming signal from being applied to the outgoing bus by cancelling the incoming signal component appearing at terminal 116-1 with the output signal from amplifier 109-1. Line circuit 103-$n$ operates in a similar manner. Summing amplifier 170 receives the outgoing signals from all selected line circuits in a distinct time slot and provides the sum of the outgoing signals to each line circuit via incoming bus 150.

Assume for purposes of illustration that line 101-1 is connected to line 101-$n$ during a distinct time slot under control of control 180, the signal on line 101-1 is $e1$ the signal on line 101-$n$ is $en$, and the signals $e1$ and $en$ are exchanged between lines 101-1 and 101-$n$ during the distinct time slot. It is to be undersood that the time division arrangements of FIG. 1 are not limited to a signal exchange between two lines but that signals may be exchanged among more than two lines during the distinct time slot. In the distinct time slot, control 180 provides an enabling control signal A1 to line circuit 103-1 and an enabling control signal A$n$ to line circuit 103-$n$. Control signal A1 closes switches 105-1 and 119-1 in circuit 103-1 and control signal An closes switches 105-$n$ and 119-$n$ in circuit 103-$n$ during the distinct time slot.

In response to the signal $e1$ applied to line 101-1, the signal $e1/2$ appears on the output of amplifier 115-1 in circuit 103-1 during the distinct time slot. Similarly, in response to signal $en$ applied to line 101-$n$, the signal $en/2$ appears on the output of amplifier 115-$n$ in circuit 103-$n$ during the distinct time slot. The signals $e1/2$ and $en/2$ are applied to the input of summing amplifier 170 via impedances 117-1, 117-$n$ and outgoing bus 160. The gain of summing amplifier 170 is selected so that one-half the sum signal is sent to each of stores 107-1 and 107-$n$ in the distinct time slot. This assures lossless transmission through the time division network. At the end of the distinct time slot, stores 107-1 and 107-$n$ each contains the signal $e1/4 + en/4$ transmitted via incoming bus 150.

Amplifier 109-1 is operative to subtract twice the signal output of amplifier 115-1 from four times the signal in store 107-1. In the interval between distinct time slots, a portion of the line 101-1 outgoing signal i.e., $e1/4$ is supplied to store 107-1 through impedance network 108-1 so that the line 101-1 signal portion on store 107-1 corresponds to the instantaneous value of the outgoing signal on the output of amplifier 115-1. Thus, the output of amplifier 109-1 is $4(en/4 + e1/4) - 2e1/2 = en$. The signal $en$ from the output of amplifier 109-1 is transmitted through matching impedance 111-1 to terminal 116-1 of transformer 113-1. Since impedance 111-1 matches the impedance presented to terminal 116-1 from transformer 113-1, the voltage $en/2$ appears at terminal 116-1 and this voltage is coupled to line 101-1 through transformer 113-1. The outgoing voltage from line 101-1 is also coupled through transformer 113-1 to terminal 116-1 so that the voltage at terminal 116-1 is $en/2 + e1/2$. Amplifier 115-1 is operative to subtract one-half the output signal of amplifier 109-1 from the signal on terminal 116-1. The output of amplifier 115-1 is $e1/2 + en/2 - (1/2)(en) = e1/2$.

In accordance with the invention, amplifier 109-1 cancels the outgoing signal component stored in store 107-1 with the outgoing signal appearing on the output of amplifier 115-1 whereby only the signal from line 101-$n$ is applied to line 101-1. Amplifier 115-1 cancels the incoming signal component on line 101-1 ($en/2$) with the output of amplifier 109-1 whereby only the signal from line 101-1 is applied to outgoing bus 150. Line circuit 103-$n$ operates in a similar manner so that only the signal $e1/2$ is transferred to line 101-$n$ as a result of the outgoing signal on line 101-1 and only the signal $en/2$ is applied from line circuit 103-$n$ to outgoing bus 160. In this way, signals are exchanged between lines 101-1 and 101-$n$ in a distinct time slot. Where more than two line circuits are selected during a distinct time slot, as in a conference connection, signals are exchanged among the selected line circuits and only the signals from the other selected lines are applied to a particular selected line.

Figure 2:
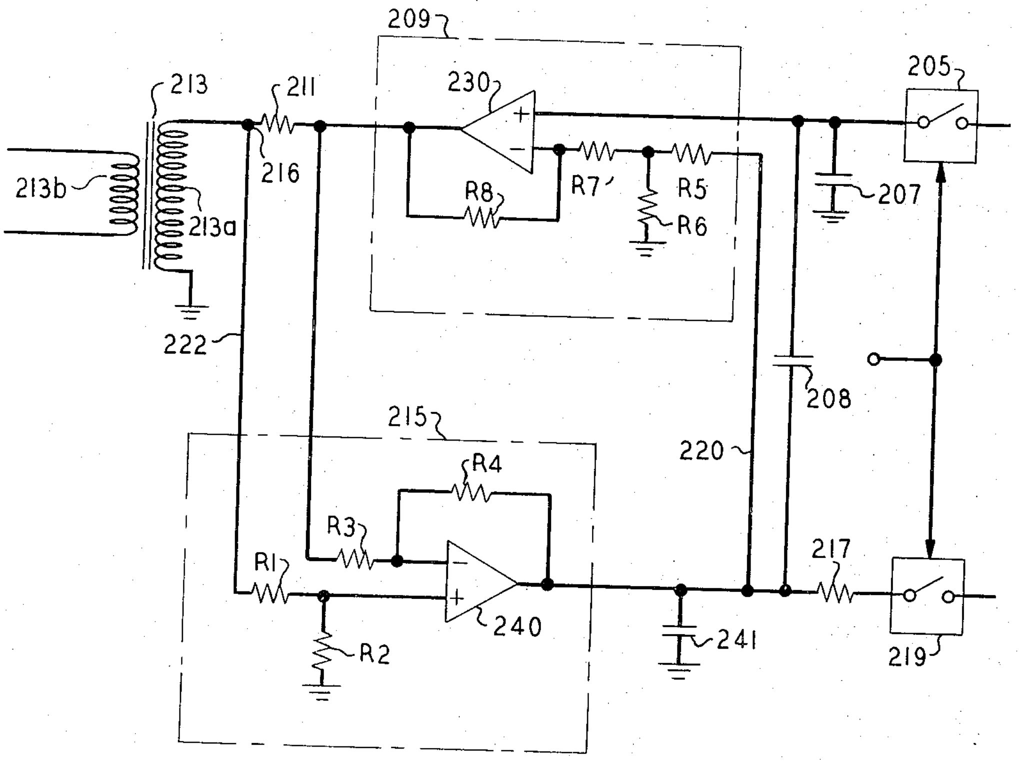
FIG. 2 shows a schematic diagram of a line circuit useful in the embodiment of FIG. 1.

FIG. 2 shows a schematic diagram of a line circuit that may be used as circuit 103-1 or circuit 103-$n$ in the time division arrangements of FIG. 1. In the circuit of FIG. 2, capacitor 207 corresponds to store 107-1, impedance 211 corresponds to matching impedance 111-1. Transformer 213 corresponds to transformer 113-1, impedance 217 corresponds to impedance 117-1, and capacitor 208 corresponds to impedance network 108-1. Time division switches 205 and 219 correspond to switches 105-1 and 119-1 in line circuit 103-1. Where the circuit of FIG. 2 is used as line circuit 103-1, the signal $e1/4 + en/4$ is stored in capacitor 207 during the distinct time slot, the signal $e1/4$ is applied to store 107-1 through capacitor 108-1 from the output of amplifier 215, and signal e1 is applied from line 101-1 to winding **213-*b* of transformer 213**.

Amplifier 209 comprises high gain operational amplifier 230 and impedances R5, R6, R7 and R8. Amplifier 215 comprises high gain operational amplifier 240 and impedances R1, R2, R3 and R4. Operational amplifiers 230 and 240 are of the type well known in the art and are described in "Operational Amplifiers, Design and Applications," by Tobey, Graeme and Hullman, McGraw Hill Book Company, 1971. It is to be understood that amplifiers 209 and 215 could alternatively comprise differential amplifiers or other devices well known in the art to provide the required subtraction function. In terms of impedances $R_5$, $R_6$, $R_7$, and $R_8$, the transfer function from store 207 to the output of operational amplifier 230 is $$G_1 = 1 + \frac{R_8}{R_7 + \dfrac{R_5 R_6}{R_5 + R_6}}$$

and the transfer function from lead 220 to the output of operational amplifier 230 is $$G_2 = -\left(\frac{R_6}{\quad}\right)\left(\frac{R_8}{R_7 + \dfrac{R_5 R_6}{R_5 + R_6}}\right)$$

where $R_5 = 3000$ ohms, $R_6 = 6{,}000$ ohms, $R_7 = 2{,}000$ ohms and $R_8 = 12{,}000$ ohms, G1 is 4 and G2 is 2. Thus the output signal voltage of operational amplifier 230 for $e1/2$ at the output of operational amplifier 240 and $en/4 + e1/4$ on store 207 is $$4\ (en/4 + e1/4) - 2e1/2 = en.$$

Capacitor 208 is selected so that the signal $e1/4$ is supplied to capacitor 207 responsive to the signal $e1/2$ on the output of amplifier 240 in the interval between distinct time slots. Where the capacitance of capacitor 207 is $C_1$, the capacitance of capacitor 208 is $C_2$, and the transmission loss factor through the time division network including bus 150, summing amplifier 170 and bus 160 is 1/2, it is required that $C_1/(C_1 + C_2) = ½$ whereby $C_1 = C_2$. $C_1$ and $C_2$ may each be 432 P*f* for the aforementioned resistance values.

The transfer function from terminal 216 to the output of operational amplifier 240 is $$G_3 = (R_2/[R_1+R_2])\ (1 + [R_4/R_3])$$

and the transfer function from the output of operational amplifier 230 to the output of operational amplifier 240 is $$G_4 = -\ R_4/R_3.$$

where $R_1 = 3{,}333$ ohms, $R_2 = 6{,}667$ ohms, $R_3 = 10{,}000$ ohms and $R_4 = 5{,}000$ ohms, $G_3$ is unity and $G_4$ is 0.5. Consequently, the signal voltage at the output of operational amplifier 240 responsive to the signal *en* at the output of amplifier 230 and the signal $e1/2 + en/2$ at terminal 216 is $$(e1/2 + en/2 - (1/2)en = e1/2.$$

The outgoing signal from the output of operational amplifier 240 ($e1/2$) is transmitted through impedance 217 and switch 219 to outgoing time division bus 160 in FIG. 1 during the distinct time slot. Capacitor 241 on the output of amplifier 240 is used to prevent overloading of amplifier 240 during the distinct time slot when switch 219 is closed.

Generally, the components in amplifier 209 must be selected so that the outgoing signal in storage capacitor 207 is cancelled by the outgoing signal appearing on the output of amplifier 215. This requires that $$G_2 = KG1$$

where $K$ is the transmission loss through the time division network from the output of amplifier 215 to the input of amplifier 209 connected to storage capacitor 207. The components in amplifier 215 must be selected so that only the signals on the communication path other than the outgoing signals are cancelled by the output signal from amplifier 209. When transformer 213 is not lossless, the impedance of the line becomes $(1-\alpha)$R as viewed from winding **213*a* and impedance 211 becomes $\alpha$R, where $\alpha$ is the mismatch factor due to transformer loss. For an ideal or lossless transformer $\alpha$ is ½. It is to be understood that coupling arrangements other than transformers could be used to connect amplifiers 209 and 215 to the associated communication path. This requires that the signal on the output of amplifier 215 due to the signal on the output of amplifier 209 cancels the signal on the output of amplifier 215 due to the outgoing line signal across winding 213**a, i.e., $$G_4 = (1-\alpha)\ G_3$$

The relationship between $C_1$ and $C_2$ is $C_1/(C_1 + C_2) = K$ so that $C_1\ (-K)/K = C_2$. In this manner the transmission from the output of amplifier 240 to capacitor 207 is the same as the transmission from the output of amplifier 240 to capacitor 207 through impedance 217, outgoing bus 160, summing amplifier 170 and incoming bus 150.

What is claimed is:

1. A time division communication system wherein a plurality of time slots occurs in repetitive cycles comprising a plurality of communication paths, an incoming time division bus, an outgoing time division bus, each communication path having an associated circuit connected to said communication path and selectively connectible to said incoming and outgoing buses, means for exchanging signals among a plurality of selected communication paths comprising means for connecting said incoming bus and said outgoing bus to each selected communication path in a distinct time slot, means connected between said incoming and outgoing buses for producing a signal corresponding to the sum of the selected communication path outgoing signals appearing on said outgoing bus in said distinct time slot, and means for applying said produced signal to said incoming bus in said distinct time slot, each communication path circuit comprising means for storing a sample of said produced signal received from said incoming bus in said distinct time slot, first and second amplifying means each having first and second inputs and an output, said first amplifying means first input being connected to said storing means, said first amplifying means second input being connected to said second amplifying means output, means for coupling said first amplifying means output to said communication path, said second amplifying means first input being connected to said communication path, said second amplifying means second input being connected to said first amplifying means output, means for coupling said second amplifying means output to said outgoing bus in said distinct time slot, said first amplifying means comprising means for canceling the communication path outgoing signal portion of said produced signal from said storage means with said second amplifying means output signal, said second amplifying means comprising means for canceling the portion of the produced signal coupled to said communication path with the first amplifying means output signal, wherein the improvement comprises means connected between said second amplifying means output and said storing means for directly coupling a portion of said second amplifying means output signal to said storing means.

2. A time division communication system wherein a plurality of time slots occurs in repetitive cycles according to claim 1 wherein said means for directly coupling a portion of said second amplifying means output to said storing means comprises an impedance network connected between said second amplifying means output and said storing means.

3. A time division communication system wherein a plurality of time slots occurs in repetitive cycles according to claim 2 wherein said impedance network comprises a capacitor having a first terminal connected to said second amplifying means output and a second terminal connected to said storing means.

4. A time division communication system wherein a plurality of time slots occurs in repetitive cycles comprising a plurality of lines, an incoming bus, an outgoing bus, each line having an associated circuit connected to said line and connectible to said incoming and outgoing buses, means for exchanging signals among a plurality of selected lines comprising means for connecting said incoming bus and said outgoing bus to each selected line circuit in a distinct time slot, a summing amplifier connected from said outgoing bus to said incoming bus for producing a signal proportional to the sum of said selected line outgoing signals appearing on said outgoing bus in said distinct time slot, and means for applying said produced signal to said incoming bus in said distinct time slot, each line circuit comprising a storage capacitor for storing a sample of said produced signal in said distinct time slot and first and second operational amplifiers each having a positive input, a negative input and an output, means for coupling said produced signal from said storage capacitor to said first operational amplifier positive input, means for coupling the second operational amplifier output to the first operational amplifier negative input, said first operational amplifier comprising means for subtracting a signal proportional to the signal appearing at the output of said second operational amplifier from a signal proportional to said produced signal appearing on said storage capacitor whereby the signals from the other selected lines are transferred to said associated line, means for coupling the signal appearing on said associated line to said second operational amplifier positive input, means for coupling the signal appearing on the first operational amplifier output to the second operational amplifier negative input, and means for coupling the second operational amplifier to said outgoing bus in said distinct time slot, said second operational amplifier comprising means for subtracting a signal proportional to the signal on said first operational amplifier output from a signal proportional to the signal appearing on said associated line whereby the outgoing signal from said associated line is transferred to said outgoing bus in said distinct time slot, wherein the improvement comprises impedance means connected between said second operational amplifier output and said storage capacitor for applying a portion of the signal appearing at the output of said second operational amplifier to said storage capacitor.

5. A time division communication system wherein a plurality of time slots occurs in repetitive cycles according to claim 4 wherein said impedance means comprises a capacitor having a first terminal connected to the output of said second operational amplifier and second terminal connected to said storage capacitor.

* * * * *

UNITED STATES PATENT OFFICE

CERTIFICATE OF CORRECTION

Patent No. 3,835,259 Dated September 10, 1974

Inventor(s) David G. Medill and Patrick A. Vachon

It is certified that error appears in the above-identified patent and that said Letters Patent are hereby corrected as shown below:

Col. 5, line 35, rewrite equation as follows:

$$-- G_2 = -\left(\frac{R_6}{R_5+R_6}\right)\left(\frac{R_8}{R_7+\frac{R_5R_6}{R_5+R_6}}\right) --.$$

Col. 6, line 42, change "$C_1(-K)/K = C_2$" to --$C_1(1-K)/K = C_2$--.

Signed and sealed this 3rd day of December 1974.

(SEAL)
Attest:

McCOY M. GIBSON JR.
Attesting Officer

C. MARSHALL DANN
Commissioner of Patents